Nov. 13, 1956   L. JOHNSTON ET AL   2,770,675
TAPE MOVEMENT CHECK IN A TELEGRAPH SYSTEM
Filed Oct. 26, 1953
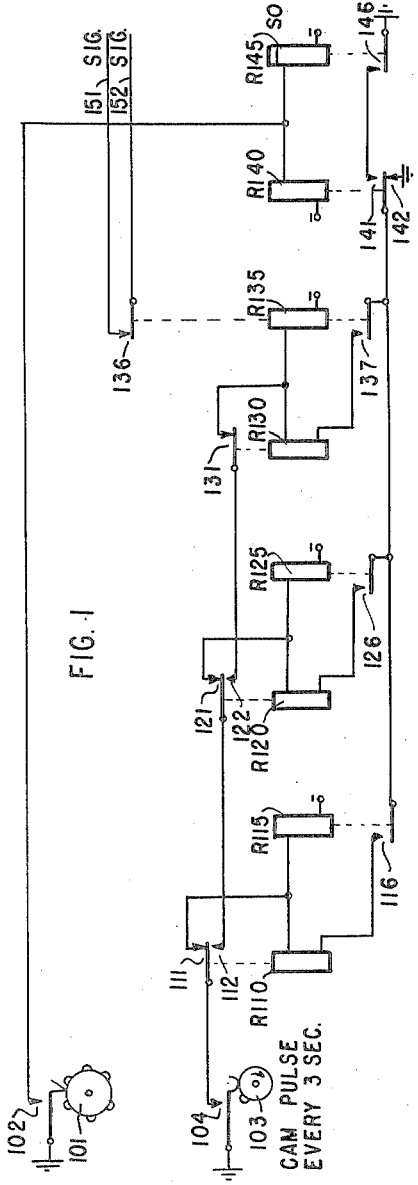
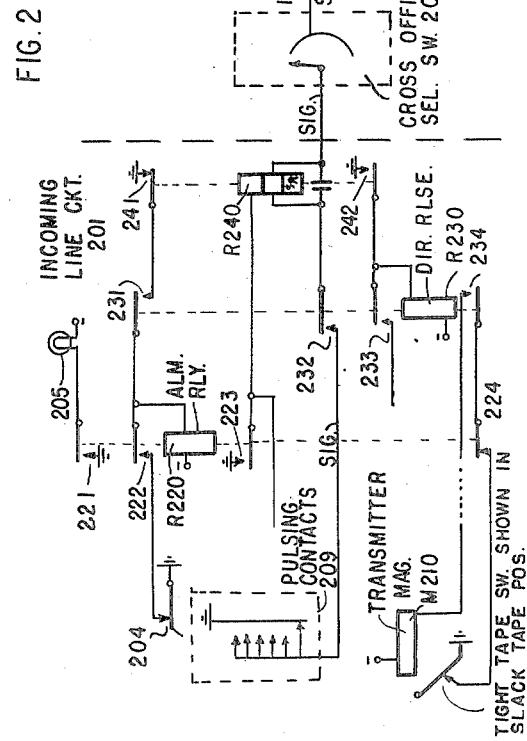
INVENTORS.
LEITH JOHNSTON
HAROLD J. MᶜCREARY
BY RICHARD C. STILES
ATTY United States Patent Office 2,770,675
Patented Nov. 13, 1956

2,770,675

TAPE MOVEMENT CHECK IN A TELEGRAPH SYSTEM

Leith Johnston, Chicago, Harold J. McCreary, Lombard, and Richard C. Stiles, La Grange, Ill., assignors to Automatic Electric Laboratories, Inc., Chicago, Ill., a corporation of Delaware Application October 26, 1953, Serial No. 388,329

5 Claims. (Cl. 178—17.5)

This invention relates to telegraph systems and more particularly to supervisory equipment for use with message-recording mechanisms in telegraph systems.

In telegraph systems using teletypewriters, it is important that an alarm be given, to avoid the loss of a message or messages during transmission in case that the tape being fed to a reperforator breaks, if the transmitter fails to operate or if the reperforator motor and tape feed mechanism fails to feed tape to the reperforator.

It will be noted that in an earlier copending application of H. J. McCreary, Serial No. 387,580, filed October 22, 1953, a means for checking the movement of tape is disclosed. In said copending application, a timing means is utilized for giving an alarm after a predetermined time if the tape is not properly fed to the reperforator during the receipt of telegraph signals by the reperforator. Further, a means controlled by the movement of the tape is provided for preventing said timing means from giving an alarm if the tape is moving properly. Two species of a means controlled by the tape movement are shown in said copending application: (1) a roller frictionally driven by the tape, and (2) a projection (or projections as needed) on the tape reel itself. The projections on the tape reel are felt to be preferable since there is no problem of slippage as there is with the frictionally driven roller.

However, a new problem arises with the use of projections on the tape reel since the tape reel rotates faster and faster as the amount of tape on the tape reel decreases. Said copending application cannot handle this problem with complete reliability.

The new and improved structure shown herein is adapted to overcome said problem and further discloses a greatly simplified, less expensive arrangement which will require a minimum of maintenance.

Therefore, it is an object of this invention to provide a new and improved means for continuously checking the movement of tape being fed to a reperforator and for giving an alarm if the tape fails to move while the reperforator is receiving signals.

It is a further object of this invention to provide means for giving an alarm and for stopping the transmission of signals from a transmitter to a reperforator if, during said transmission, the tape to be fed to the reperforator should stop moving or fail to start moving.

A feature of this invention is the use of a relay counting chain for giving an alarm when the reperforator tape is not moving properly.

Another feature is the means for restoring the relay counting chain completely to normal each time the tape reel rotates a predetermined amount, whereby a short temporary fault which corrects itself will not cause an alarm and also whereby compensation may be made for the difference in the speed of rotation of the tape reel when a full roll of tape is placed thereon and when the roll is nearly exhausted.

A further feature is the use of a pair of relays, one for restoring operated relays in the counting chain when it is operated by the tape reel, the other for reclosing the holding circuit for the relays in the counting chain to permit an alarm to be given if the tape reel should stop in a position such that it will cause said one relay to remain operated.

Further features will be evident upon a perusal of the following disclosure in which:

Fig. 1 discloses the relay counting chain for initiating the operation of the alarm equipment, and Fig. 2 shows the equipment controlled by the counting chain for giving an alarm.

It will be noted that, although the herein disclosed invention has been developed for use with reperforators in the automatic telegraph switching system disclosed in the copending application of R. C. Stiles, Serial No. 260,854, filed December 10, 1951, it will be understood that said invention may be utilized with other signal-receiving recording mechanisms.

If a reperforator, permanently connected to a single source of signals, fails to record a received message, the unrecorded message can easily be determined by checking the messages sents from the single source even though considerable time has elapsed before the discovery of the fault.

However, a continuous reperforator tape movement check is felt to be imperative when a reperforator, such as a cross office reperforator 3410 shown in the above-mentioned copending application of R. C. Stiles, can be selected for receiving signals from any one of a plurality of sources. The task of comparing all messages received from all of said sources with all messages recorded by all of the available cross office unit reperforators, as well as the reperforators associated with the multiple call position 3340 and the intercept operator position 3330 shown in said copending application of R. C. Stiles, would become difficult and burdensome. Therefore the present invention may be utilized to its best advantage when used with the reperforators associated with the cross office units, the multiple call position and the intercept operator position shown in said copending application of R. C. Stiles.

In the case disclosed herein, a cam operates a set of contacts once every three seconds as long as a cross office unit reperforator (as shown in said copending application of R. C. Stiles) is seized for transmission thereto of signals from an incoming line circuit transmitter (as shown in said copending application of R. C. Stiles). A first operation of said contacts operates a first pair of relays in a counting chain, said relays being maintained operated over a locking circuit. A second operation of the contacts will operate and lock a second pair of relays in the counting chain but only if the first pair of relays is operated; and similarly a third pair of relays will be operated and locked operated by a third operation of the contacts but only if the first and second pairs of relays are operated. The operation of the third pair of relays will open a signalling circuit which has been established between the transmitter and the reperforator. When said signalling circuit is opened, an alarm relay will be controlled to operate an alarm and to stop the transmission of signals by the transmitter.

However if, during the transmission of signals from the transmitter to the reperforator, the tape reel is rotating to feed tape to the reperforator, a projection on the tape reel will intermittently close contacts associated therewith to operate an interrupter relay. Each time said interrupter relay operates, it opens the holding circuits for the relays in said counting chain, thereby to restore any of said counting relays if they are operated. Therefore as long as the tape reel is rotating to operate the interrupter relays at intervals less than six seconds apart, the third pair of relays in the counting chain cannot be operated and no alarm will be given.

Before discussing the detailed operation of the circuits of Fig. 1, it may be well to point out the manner in which the circuits of Fig. 2 operate in the system disclosed in the above-mentioned copending application of R. C. Stiles. Since a complete, detailed description is made in said Stiles application, it is felt sufficient to disclose and briefly describe only those parts of the system which are pertinent to the herein proposed invention.

When a message is received by an incoming line circuit such as circuit 201 of Fig. 2 (only part of which is shown herein), a reperforator associated with said line circuit records the message on a tape. A director (not shown) is selected for processing the message. The director will control a cross office selector switch such as switch 202 (part of which is shown), which switch is associated with incoming line circuit 201, to seize a cross office unit such as unit 203 (part of which is shown) if said unit is available. Upon seizure of the cross office unit, a motor (not shown) of the cross office unit reperforator (not shown) is started; and control circuits in the cross office unit are conditioned under the control of the director for automatic retransmission of the message over an outgoing line (not shown) to which the cross office unit is connected.

When said cross office unit has been connected to said outgoing line and when said control circuits have been conditioned, an open line relay R240 in the incoming line circuit 201 is operated over a circuit (not fully shown) including its upper winding. When R240 operates, it closes contacts 242 to operate a director release relay R230, and controls means (not shown) for starting the rotation of cam 103 (Fig. 1) and for operating the reperforate relay R250.

At contacts 232 and 251, relays R230 and R250 complete a signal circuit extending from ground on the pulsing contacts 209 of the transmitter (not shown) associated with the incoming line circuit 201, through contacts 232, the lower winding of R240, the cross office selector switch 202, conductor 152, contacts 136, conductor 151, contacts 251 and through the winding of the reperforate magnet M260 of the cross office unit reperforator to battery. R240 is maintained operated over this circuit when its original operating circuit is opened upon the subsequent release of the director. Also the magnet M260 will be controlled to record the message on a tape in accordance with signals sent over this signal circuit by the incoming line circuit transmitter.

Relay R230 further closes contacts 233 to complete a holding circuit (not fully shown) for itself; controls means (not shown) for initiating the release of the director; and, at contacts 234, completes an obvious circuit for operating the magnet M210 of the incoming line circuit transmitter. M210 controls the pulsing contacts 209 in a manner well known in the art, to send signals of the message recorded on a tape by the reperforator of the incoming line circuit 201. As the reperforate magnet M260 is operated in accordance with said signals, a means (not shown) in the cross office unit reperforator is controlled to remove tape from the tape reel 101 of Fig. 1 and feed the tape to said cross office unit reperforator to record the message therein.

As the tape is removed, the tape reel 101 is rotated. The speed of rotation of the reel varies depending upon the amount of tape wound on the reel, the speed increasing as the amount of tape decreases.

In view of the foregoing, it will be understood that, when the cross office unit 203 is seized for transmission of a message thereto, soon thereafter tape reel 101 and cam 103 will begin to rotate.

*Detailed description—Circuits in Fig. 1*

It will be noted that a plurality of projections are arranged around the perimeter of the tape reel 101 for operating contacts 102. The number of such projections must be such that, while the tape reel rotates at minimum speed (when the roll of tape on the tape reel is largest), contacts 102 will be operated at intervals of six seconds or less in order to insure prevention of an alarm.

As noted above, cam 103 operates contacts 104 once every three seconds. A first operation of the contacts 104 will cause the operation of relay R115 over an obvious circuit while contacts 104 are closed. When contacts 104 open, R115 maintains itself operated over a circuit including the winding of relay R110 and contacts 116 and 142. Relay R110 operates in this circuit and closes contacts 112 to prepare a circuit for operating relay R125.

When contacts 104 are closed by cam 103 three seconds later, they will, if R110 and R115 are still operated, complete a circuit including contacts 112 and 121 for operating relay R125. When said contacts 104 subsequently open, relay R125 maintains itself operated over a circuit including the winding of relay R120 and contacts 126 and 142. Relay R120 operates in this circuit and closes contacts 122 to prepare a circuit for operating the control relay R135.

If relays R110, R115, R120 and R125 are still operated three seconds later when contacts 104 are again closed by cam 103, control relay R135 operates over a circuit including contacts 104, 112, 122 and 131. When contacts 104 open, relay R135 is maintained operated over a circuit including the winding of relay R130 and contacts 137 and 142. When R135 operates it opens the signal circuit at contacts 136 to initiate the operation of the alarm circuits, as will be described later.

However if, at any time before the third operation of contacts 104, the tape reel 101 rotates to cause contacts 102 to close, an obvious circuit is completed for operating the interrupter relay R140 and the slow-to-operate relay R145. When R140 operates it opens contacts 142 in the previously decribed holding circuits for relays R110, R115, R120, R125, R130 and R135 to restore any of said relays if they are operated. It is apparent therefore that the control relay R135 cannot be operated as long as consecutive operations of the interrupter relay R140 are six seconds apart or less.

In view of the foregoing, it is apparent that R135 will be operated to open the signal circuit only if the tape reel should fail to rotate for a period of approximately six to nine seconds, for example in case that (1) the tape should break, (2) the motor of the cross office unit reperforator fails to run or (3) the feed holes in the tape were torn so that the tape feed mechanism could not advance the tape through the reperforator.

In the event the tape reel 101 stops in a position such that contacts 102 remain closed and therefore the interrupter relay R140 remains operated, the slow-to-operate relay R145 will close contacts 146 to provide an obvious alternate holding circuit for relays R110, R115, R120, R125, R130 and R135, whereby an alarm may subsequently be operated.

*Operation of the circuits of Fig. 2 to give an alarm*

Assume that the control relay R135 has opened the signal circuit at contacts 136 as previously described.

After a short time delay, the slow-to-release open line relay R240 will restore. At contacts 241, R240 completes an obvious circuit for operating the alarm relay R220.

R220 closes contacts 221 to light an alarm lamp L205; at contacts 222, completes an obvious circuit for maintaining itself operated; at contacts 223, completes an obvious circuit for reoperating the open line relay R240; and, at contacts 224, opens the circuit for operating the magnet M210 of the incoming line circuit transmitter, thereby to stop the transmission of signals.

When the fault has been discovered and corrected by an operator, said operator will manually move the tape reel so as to operate relays R140 and R145 (Fig. 1) to restore the relays in the counting chain; then, before six seconds elapse, push a release key to open contacts 204 (Fig. 2). The alarm relay R220 will restore, R240 will again be maintained operated over the signal circuit, and the transmitter magnet M210 will again operate to send signals to the reperforate magnet M260. In this respect, it may be well to mention that the tape in the transmitter will undoubtedly be repositioned manually for the transmission of the entire message, and that the tape in the cross office unit will be accordingly corrected and patched when necessary.

It will be understood that the timing of the cam contacts 104 and the tape reel contacts 107 has been given by way of example, and it is not intended that the invention disclosed herein be limited thereby.

While there has been disclosed what is at present considered to be the preferred embodiment of the invention, various modifications may be made therein; and it is contemplated to cover in the appended claims all such modifications as fall within the true spirit and scope of the invention.

What is claimed is:

1. For use in a telegraph system having a transmitter, a reperforator and a transmission circuit together with means for connecting the reperforator to the transmitter by way of the transmission circuit and for controlling the transmitter to send signals of a telegraph message to the reperforator to cause said reperforator to record the message on a tape fed thereto from a tape reel, an alarm system comprising a relay counting chain, means operated at predetermined time intervals after the reperforator is connected to the transmitter for sequentially operating successive pairs of relays in said counting chain, means controlled by the operation of the last pair of relays in the counting chain for stopping the transmission of signals and for operating an alarm, means for restoring all operated relays in the counting chain, and means controlled by the movement of the tape reel for operating said last means at predetermined time intervals, each interval less than the time required for operating all of the relays in the counting chain, whereby an alarm will be given and the transmission of signals stopped only if the tape reel fails to move while the reperforator is connected to the transmitter.

2. For use in a telegraph system having a transmitter, a reperforator and a transmission circuit together with means for connecting the reperforator to the transmitter by way of the transmission circuit and for controlling the transmitter to send signals of a telegraph message to the reperforator to cause said reperforator to record the message on a tape fed thereto from a tape reel, an alarm system comprising a relay counting chain, means operated at predetermined time intervals after the reperforator is connected to the transmitter for sequentially operating successive relays in said counting chain, a circuit means associated with each of said relays for maintaining its respective relay operated after it has been operated by said second means and for preparing the next relay in the chain for operation, means controlled by the operation of the last relay in the chain for operating an alarm and for stopping the transmission of signals, an interrupter relay for restoring all operated relays in the counting chain, circuit means controlled by the tape reel as it rotates for operating said interrupter relay at predetermined time intervals, each interval less than the minimum time required for operating all of the relays in the counting chain, thereby to prevent an alarm while the tape reel is rotating, and means for rendering the interrupter relay ineffective should said circuit means maintain the interrupter relay operated while the tape reel is stopped, whereby an alarm will be given and the transmission of signals stopped if the tape reel does not move while the reperforator is connected to the transmitter.

3. For use in a telegraph system having a transmitter, a reperforator, means for transmitting signals from the transmitter to cause repeated operation of the reperforator, a tape reel having a roll of tape thereon and means including said tape for operating said tape reel in coordination with the operations of the reperforator, a timer including a group of counting relays having a normal condition and progressively operated at predetermined intervals, means for sending periodic electrical indications of the operation of the tape reel to said timer, means operated responsive to each of said indications for restoring said relay group to its normal condition, and means controlled by a final operation of the relay group for operating an alarm and for stopping the transmission of signals from the transmitter in case said indications of the operation of the tape reel are not sent to said timer during any one of said intervals.

4. For use in a telegraph system having a transmitter, a reperforator, means for transmitting signals from the transmitter to cause repeated operation of the reperforator, a tape reel having a roll of tape thereon and means including said tape for operating said reel in co-ordination with the operations of the reperforator, a timer including a group of relays having a normal position and a final position and progressively operable to said final position within a predetermined interval during operation of said reperforator, means controlled by operation of said relays to said final position for stopping the transmission of signals from said transmitter, an interrupter operated responsive to the normal operation of said tape reel for sending electrical indications to said timer within each of said intervals, means operated responsive to each such indication for restoring said relays to their normal position, and circuit means enabling said relays to reach said final position both responsive to the absence of any of said indications and to the presence of an uninterrupted one of said indications during one of said intervals.

5. For use in a telegraph system having a transmitter, a reperforator, means for transmitting signals from the transmitter to cause repeated operation of said reperforator, a tape reel, means for operating said tape reel in co-ordination with said reperforator operations, a timer including a group of relays having a normal position and a final position and progressively operable to said final position during said reperforator operations, means controlled by the operation of said relays to said final position for stopping said transmission of said signals, a set of contacts having normal and off-normal positions, means controlled by said reel operations for moving said contacts alternately to each of said positions during each of said intervals, means for restoring said relays responsive to the movement of said contacts to their off-normal position, means enabling operation of said relays to their final position responsive to failure of said reel to move said contacts to their off-normal position during one of said intervals, and means enabling operation of said relays to their final position responsive to failure of said reel to move said contacts back to their normal position during one of said intervals.

References Cited in the file of this patent

UNITED STATES PATENTS

| | | |
|---|---|---|
| 2,142,880 | Anderson et al. | Jan. 3, 1939 |
| 2,160,463 | Spencer | May 30, 1939 |
| 2,293,704 | Blanton | Aug. 25, 1942 |
| 2,554,549 | Albert et al. | May 29, 1951 |
| 2,640,873 | Moebius | June 2, 1953 |
| 2,708,216 | Doerrfeld | May 10, 1955 |

FOREIGN PATENTS

| | | |
|---|---|---|
| 827,082 | Germany | Sept. 14, 1953 |